(12) United States Patent
AlMajed et al.

(10) Patent No.: US 11,502,818 B2
(45) Date of Patent: Nov. 15, 2022

(54) SYSTEM TO SECURE ENCODING AND MAPPING ON ELLIPTIC CURVE CRYPTOGRAPHY (ECC)

(71) Applicant: King Saud University, Riyadh (SA)

(72) Inventors: Hisham AlMajed, Riyadh (SA); Ahmad AlMogren, Riyadh (SA)

(*) Notice: Subject to any disclaimer, the term of this patent is extended or adjusted under 35 U.S.C. 154(b) by 42 days.

(21) Appl. No.: 16/868,210

(22) Filed: May 6, 2020

(65) Prior Publication Data
US 2021/0351910 A1 Nov. 11, 2021

(51) Int. Cl.
*H04L 9/00* (2022.01)
*H04L 9/30* (2006.01)

(52) U.S. Cl.
CPC ............ *H04L 9/002* (2013.01); *H04L 9/3066* (2013.01)

(58) Field of Classification Search
CPC .............................. H04L 9/002; H04L 9/3066
USPC ............................................................ 380/28
See application file for complete search history.

(56) References Cited

U.S. PATENT DOCUMENTS

| | | | | |
|---|---|---|---|---|
| 2002/0013794 A1* | 1/2002 | Carro | .................. | H04L 9/0662 715/205 |
| 2011/0087885 A1* | 4/2011 | Lerner | .................. | H04L 9/002 713/168 |
| 2011/0200186 A1* | 8/2011 | Ghouti | .................. | H04L 9/0637 380/43 |
| 2011/0202766 A1* | 8/2011 | Lerner | .................. | H04L 67/38 713/168 |
| 2016/0328541 A1* | 11/2016 | Hoogerbrugge | ........ | G06F 7/723 |
| 2017/0104580 A1* | 4/2017 | Wooten | .................. | G06F 8/65 |
| 2020/0044832 A1* | 2/2020 | Zhang | .................. | H04L 9/3073 |
| 2020/0119918 A1* | 4/2020 | Rietman | .............. | H04L 9/3066 |

FOREIGN PATENT DOCUMENTS

| | | | | | |
|---|---|---|---|---|---|
| CN | 103117850 A | * | 5/2013 | | |
| HR | P990248 A2 | * | 8/1999 | .............. | G09C 1/00 |
| HR | P990248 A2 | * | 2/2006 | .............. | G09C 1/00 |
| JP | H08510365 A | * | 3/1994 | .............. | H04L 9/06 |
| JP | 2012177893 A | * | 9/2012 | | |
| WO | WO-0217554 A2 | * | 2/2002 | ........... | H04L 9/0637 |

OTHER PUBLICATIONS

Almajed et al. "SE-Enc: A Secure and Efficient Encoding Scheme Using Elliptic Curve Cryptography", in IEEE Access, vol. 7, pp. 175865-175878, 2019. (Year: 2019).*

Surendiran et al. "Elliptic curve cryptography for secured text encryption", IEEE, doi: 10.1109/ICCPCT.2017.8074210, 2017, pp. 1-5. (Year: 2017).*

(Continued)

*Primary Examiner* — Peter C Shaw
(74) *Attorney, Agent, or Firm* — Walker Griffin Weitzel; Alloy Patent Law (57) ABSTRACT

A system in Elliptic Curve Cryptography (ECC) that offers secure encoding and mapping of a message to the curve E against encryption attacks, such as Chosen Plaintext Attack (CPA) and Ciphertext Only Attack (COA). The system includes, a method to convert the text message to numerical values with manipulation using Initial Vector IV. In addition, the system provides, a method to revert the manipulated values to their original value.

12 Claims, 8 Drawing Sheets

(56) References Cited

OTHER PUBLICATIONS

Amounas et al. "Secure encryption scheme of amazigh alphabet based ECC using finite state machine", IEEE, doi: 10.1109/JNS3.2013.6595477, 2013, pp. 1-4. (Year: 2013).*

Amounas et al., "Secure encryption scheme of amazigh alphabet based ECC using finite state machine," 2013 National Security Days (JNS3), 2013, pp. 1-4, doi: 10.1109/JNS3.2013.6595477. (Year: 2013).*

Keerthi et al., "Elliptic curve cryptography for secured text encryption," 2017 International Conference on Circuit ,Power and Computing Technologies (ICCPCT), 2017, pp. 1-5, doi: 10.1109/ICCPCT.2017.8074210. (Year: 2017).*

Udin et al., "Application of message embedding technique in ElGamal Elliptic Curve Cryptosystem," 2012 International Conference on Statistics in Science, Business and Engineering (ICSSBE), 2012, pp. 1-6, doi: 10.1109/ICSSBE.2012.6396578. (Year: 2012).*

Das et al., "An Efficient Method for text Encryption using Elliptic Curve Cryptography," 2018 IEEE 8th International Advance Computing Conference (IACC), 2018, pp. 96-101, doi: 10.1109/IADCC.2018.8692087. (Year: 2018).*

Genç et al., "Implementation of New Message Encryption using Elliptic Curve Cryptography Over Finite Fields," 2021 International Congress of Advanced Technology and Engineering (ICOTEN), 2021, pp. 1-6, doi: 10.1109/ICOTEN52080.2021.9493519. (Year: 2021).*

* cited by examiner

SYSTEM TO SECURE ENCODING AND MAPPING ON ELLIPTIC CURVE CRYPTOGRAPHY (ECC)

CROSS-REFERENCE TO RELATED APPLICATIONS

The present application claims priority to provisional patent application No. 62/951,220, filed on Dec. 20, 2019, disclosure of which is incorporated herein at least by reference.

BACKGROUND OF THE INVENTION

1. Field of the Invention

The present invention in the field of Elliptic Curve Cryptography and pertains particularly to encoding and mapping steps on ECC.

2. Description of Related Art

Elliptic curve cryptography (ECC) is an approach to asymmetric cryptography used widely in low computation devices due to its effectiveness in generating small keys with a strong encryption mechanism. Currently, the main usage of ECC is to exchange a shared key between two parties to symmetric encrypt and decrypt the ciphertext. However, many models and schemes use ECC to encrypt messages directly using several methods and approaches.

These methods and approaches suffer from weak implementation resulting to many encryption flaws and weaknesses. The main phase in the ECC phases that need to strong implementation is the encoding and mapping phase where the message converted to numerical values to be mapped to the curve used in the encryption. While these methods and approaches actually create ciphertexts, however these ciphertext are not resisting some encryption attacks, such as Chosen Plaintext Attack (CPA) and Ciphertext only Attack (COA).

Therefore, what is clearly needed is a method to securely encoding and mapping in ECC, that solves the weaknesses mentioned above.

BRIEF SUMMARY OF THE INVENTION

In an embodiment of the present invention a system for securing the encoding and mapping in ECC against several encryption attacks, including steps to secure a message using ECC, and a method for converting the message to set of blocks of binary value. Also, a method to encode the set of blocks of binary value using IV to secure the message blocks. In addition, a method to map the encoded set of blocks to elliptic curve E. Also, including a method for decoding the mapped points using IV to retrieve the message to its original value.

DETAILED DESCRIPTION OF THE INVENTION

The inventor provides a secure encoding and mapping step in the ECC to enable the ciphertext to resist encryption attacks such as CPA and COA attacks. The present invention is described in enabling detail in the following examples, which may represent more than one embodiment of the present invention.

Figure 1:
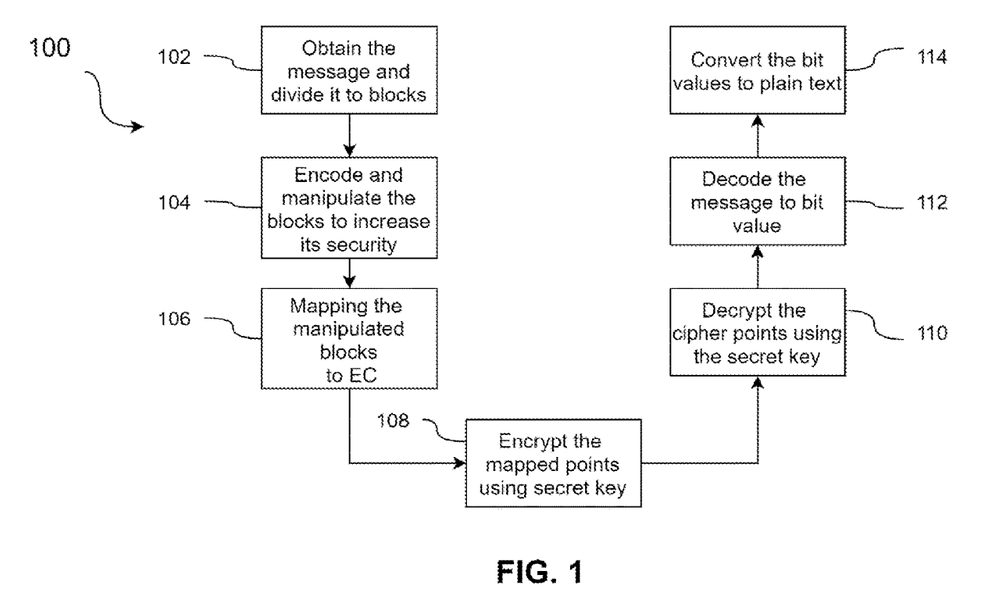
FIG. 1 is a flowchart describes steps to secure messages by encoding and mapping the plaintext using ECC according to an embodiment of the invention.

FIG. 1 is a flowchart 100 describes the steps to secure messages by encrypting the plaintext using ECC according to an embodiment of the invention. Flowchart 100 is in this example a flowchart to enhance the ciphertext resistance to encryption attacks produced by ECC. Flowchart 100 has 7 steps, they are step 102, 104, 106, 108, 110, 112 and 114. These steps described as following, Step 102: System obtains a plaintext message M, and divide it to set of blocks $\{B_1, B_2, \ldots, B_n\}$, each size of block is based on the size of p. The detail process of this step depicted on FIG. 2. Step 104: The process of encoding and manipulating each block $\{B_1, B_2, \ldots, B_n\}$ that produced from step 102, with Initial Vector IV and it result with set of manipulated blocks $\{B'_1, B'_2, \ldots, B'_n\}$. These blocks are secured and resisted the encryption attacks such as CPA and COA. These steps are described in details in FIG. 3.

Step 106: The process of converting the blocks $\{B'_1, B'_2, \ldots, B'_n\}$ to numerical values as ECC deals only with numbers. Thus, these blocks converted to numerical values to map them to ECC and secure them. Each numerical value is assigned to $x_i$ and then mapped to EC by finding the value of $y_i$ that satisfy the EC equation. The mapping to EC may need more than one rounds, therefore $x_i$ is multiplied by 31 to increase the number of rounds to 32. These steps are described in details in FIG. 4. Step 108: shows the encryption process by the addition+operation between the mapped points $(x_i, y_i)$ from step 106 and the shared key $S_{key}$ which known only by the sender and the recipient. The addition operation results the encrypted points $(C_{xi}, C_{yi})$. These steps are described in details in FIG. 5.

Step 110: shows the decryption process which is the reverse way of encryption. The step to decrypt the received points $(C_{xi}, C_{yi})$ is by subtract it from the shared $S_{key}$. The result is the mapped points $(x_i, y_i)$ that used to decode the message. These steps are described in details in FIG. 6. Step 112: shows the decoding process to convert the mapped points $(x_i, y_i)$ to plaintext. This done by dividing the $x_i$ and converting it to its binary value. Following that, the first binary block is XORed ⊕ with the IV, while the rest of blocks are ⊕ with its previous $x_i$ value. These steps are described in details in FIG. 7. Step 114: shows the converting process of the binary values from previous step and group each 8 bits of these values to convert it to its corresponding character where the plaintext is all characters grouped in one set. These steps are described in details in FIG. 8.

Figure 2:
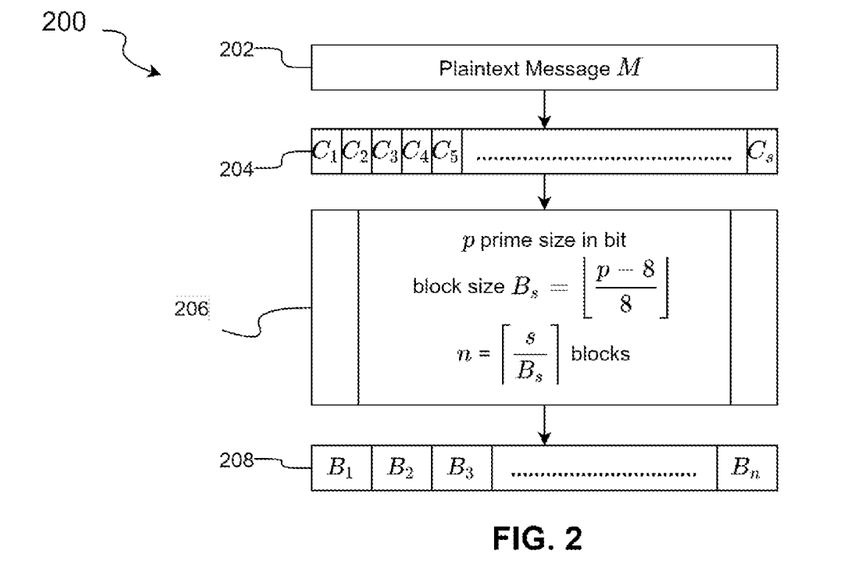
FIG. 2 is a diagram describes the step 102 in FIG. 1, the encoding and the converting of a plaintext to set of binary values and grouping them in a set of blocks $B_n$.

FIG. 2 is a diagram 200 describes the step 102 in FIG. 1, an encoding and a converting of a plaintext to set of binary values and grouping them in a set of blocks $B_n$. Step 202: Obtain a plaintext message M. Step 204: Divide the M to set of $\{c_1, c_2, \ldots, c_s\}$. The value of s is the represented as the number of characters in the message M. Step 206: Obtain the size of the prime number p and obtain the block size $B_s$ by the equation $$B_s = \left\lfloor \frac{p-8}{8} \right\rfloor$$

and the number of blocks n that used to group the set of characters $B_s$ is calculated by $$n = \left\lceil \frac{s}{B_s} \right\rceil.$$

Step 208: Group each set of characters (presented in binary values) $\{c_1, c_2, \ldots, c_{B_s}\}$. to one group, the result is a set of blocks $\{B_1, B_2, \ldots, B_n\}$. The number of characters in one group is equal to $B_s$.

Figure 3:
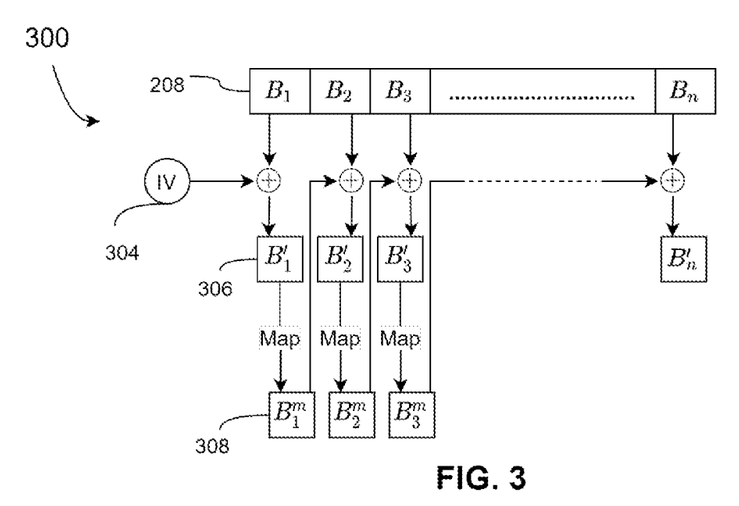
FIG. 3 is a diagram describes the step 104 in FIG. 1, the process of securing the set of blocks $B_n$ from FIG. 2, which results to set of secured blocks $B'_n$. This figure described in algorithm 1.

FIG. 3 is a diagram 300 describes the step 104 in FIG. 1, the process of securing the set of blocks $B_n$ from FIG. 2, which results to set of secured blocks $B'_n$. Step 208: Obtain the set of blocks $\{B_1, B_2, \ldots, B_n\}$ from the previous step (FIG. 2 step 208). Step 304: Obtain the random IV with same size of p and for each i={1, 2, \ldots, n} obtain $B_i$ and ⊕ it with IV which results $B'_i$. Then, map the $B'_i$ to the elliptic curve E which results $B_i^m$. Afterward, assign IV=$B_i^n$. Step 306: Each $\{B'_1, B'_2, \ldots, B'_n\}$ are the secured encoded blocks that against several encryption attacks. The process of securing these blocks is described on algorithm 1. Step 308: is the mapping point process depicted in FIG. 4.

| Algorithm 1: Encoding message with IV algorithm |
|---|
| Input: Blocks retrieved ($B_i$) from message M and IV |
| Output: Encoded blocks ($B'_i$) with IV |
| 1    for i = 0; i < no of blocks; i + +; |
| 2      let $B'_i = B_i \oplus$ IV; |
| 3      let $B_i^m$ = map($B'_i$); |
| 4      let IV = $B_i^m$; |
| 5    Encoded message ← the set of $B'_i$; |

Figure 4:
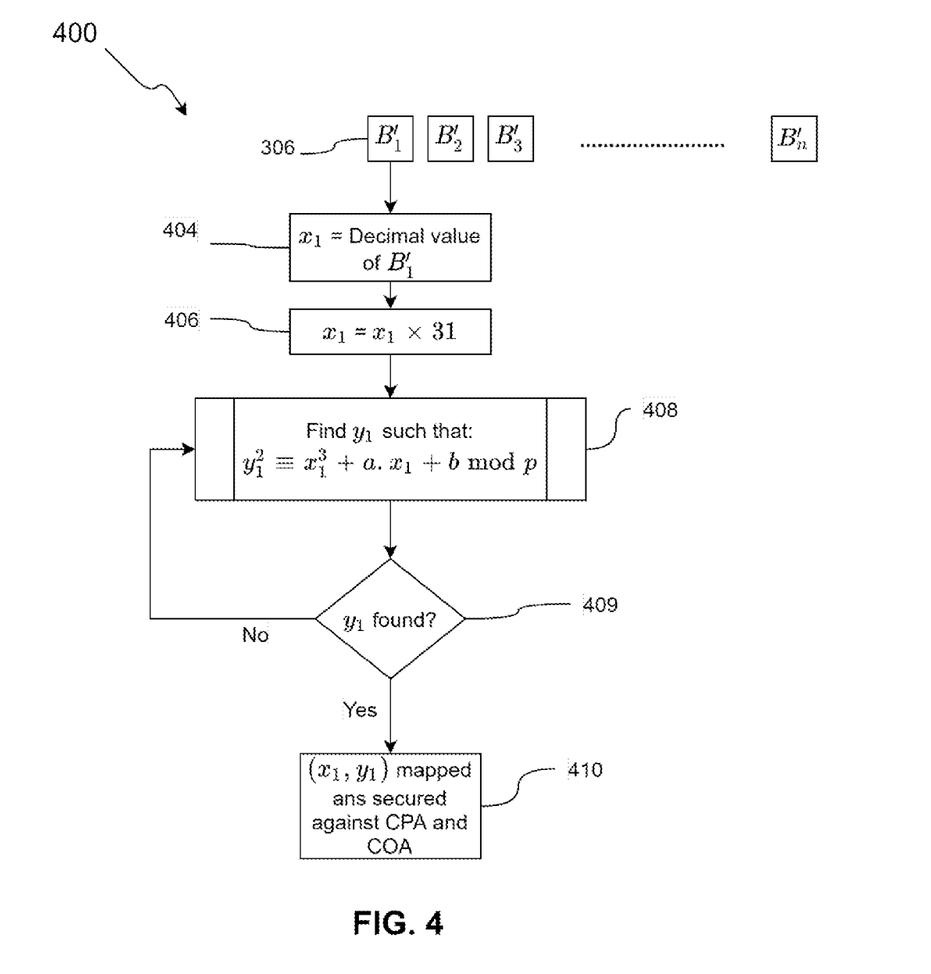
FIG. 4 is a diagram describes the step 106 in FIG. 1, the process of mapping phase which is the steps to convert the secured blocks values $B'_n$ from FIG. 3 to decimal values and map it to EC E which results to set of $(x_i, y_i)$.

FIG. 4 is a diagram 400 describes the step 106 in FIG. 1, the process of mapping phase which is the steps to convert the secured blocks values $B'_n$ from FIG. 3 to decimal values and map it to EC E which results to set of $(x_i, y_i)$. Step 404: For each i={1, 2, \ldots, n} obtain the $B'_i$ and convert it to the corresponding decimal value then assign it to $x_i$ to be used with mapping step. Step 406: Multiply each $x_i$ by 31 to limit the mapping rounds to 32 rounds. Step 408: Map each $x_i$ to EC using EC equation $y^2 \equiv x^3 + a \cdot x + b \mod p$ and find $y_i$. Step 409: If $y_i$ found then the point $(x_i, y_i)$ is mapped, otherwise increase $x_i$ by 1 and repeat the process 32 times. Step 410: Each mapped points $\{(x_1, y_1), (x_2, y_2), \ldots, (x_i, y_i)\}$ are secure against encryption attacks such as CPA and COA.

Figure 5:
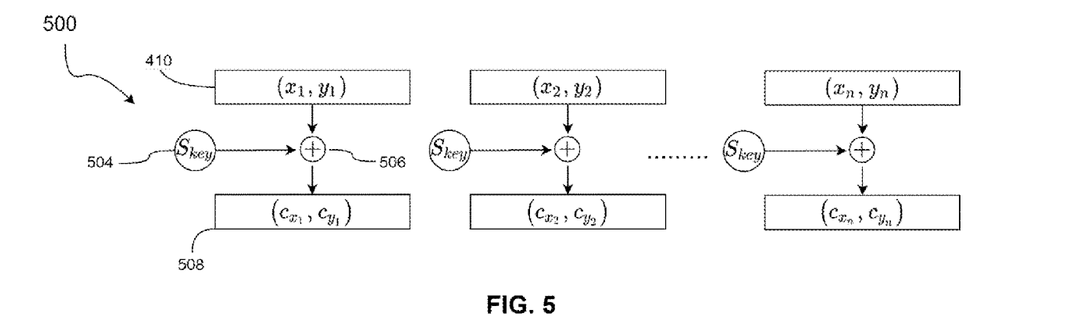
FIG. 5 is a diagram describes the step 108 in FIG. 1, the encryption mechanism to convert the mapped points $(x_i, y_i)$ from FIG. 4 to cipher text.

FIG. 5 is a diagram 500 describes the step 108 in FIG. 1, the encryption mechanism to convert the mapped points $(x_i, y_i)$ from FIG. 4 to cipher text. Step 410: For each i={1, 2, \ldots, n} retrieve the mapped points $(x_i, y_i)$ from previous step. Step 504: Construct the secret key $S_{key}$ Elliptic Curve Diffie Helman (ECDH). Step 506: Perform the addition+ operation between the mapped point $(x_i, y_i)$ and the secret key $S_{key}$. Step 508: The output is the ciphertext represented as points $(C_{xi}, C_{yi})$.

Figure 6:
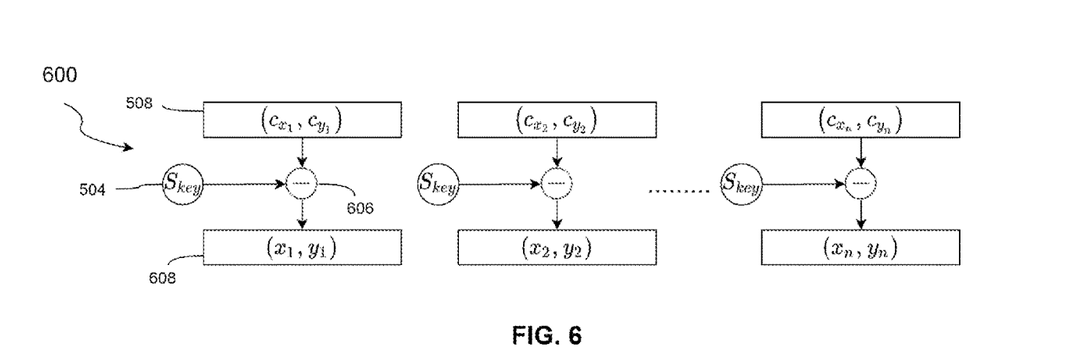
FIG. 6 is a diagram describes the step 110 in FIG. 1, the reverse process of encryption step which is the decryption step to convert the cipher text from FIG. 5 to plain mapped points $(x_i, y_i)$.

FIG. 6 is a diagram 600 describes the step 110 in FIG. 1, the reverse process of encryption step which is the decryption step to convert the cipher text from FIG. 5 to plain mapped points $(x_i, y_i)$. Step 508: For each i={1, 2, \ldots, n} retrieve the ciphertext $(C_{xi}, C_{yi})$ of the mapped points from previous step. Step 504: Construct the secret key $S_{key}$ using ECDH. Step 606: Perform the subtract process between the ciphertext of the mapped points and secret key $S_{key}$. Step 608: The output is the mapped points $(x_i, y_i)$.

Figure 7:
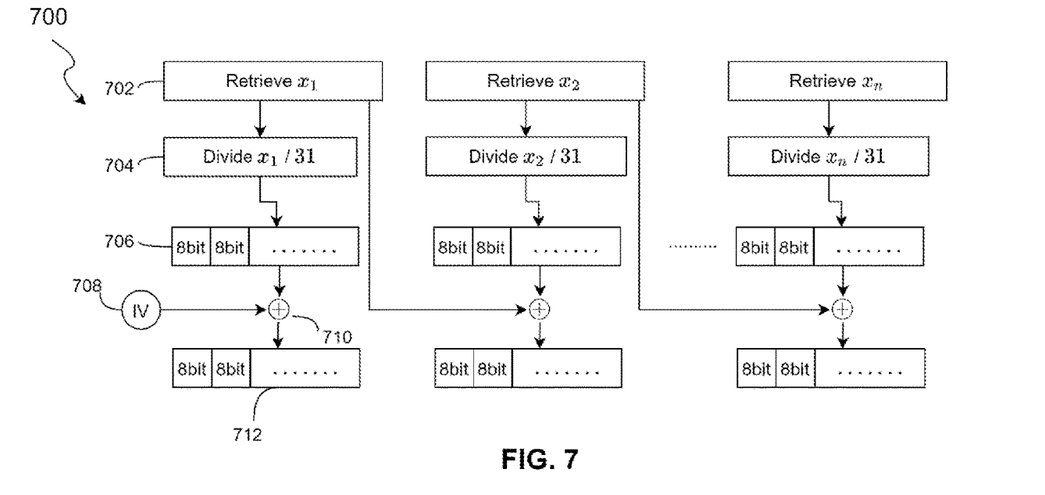
FIG. 7 is a diagram describes the step 112 in FIG. 1, the decoding step to decode the $x_i$ value from FIG. 6 to set of binary values. This figure described in algorithm 2.

FIG. 7 is a diagram 700 describes the step 112 in FIG. 1, the decoding step to decode the $x_i$ value from FIG. 6 to set of binary values. This figure described in algorithm 2. Step 702: For each i={1, 2, \ldots, n} retrieve the $x_i$ from the mapped points $(x_i, y_i)$ and assign the result to $t_i$. Step 704: Divide the decimal value of $x_i$ by 31. Step 706: Convert the $t_i$ to binary value. Step 708: Retrieve the Initial Vector IV. Step 710: Perform the ⊕ process between the binary bits from step 706 and IV, then let IV=$x_i$ from step 702. Step 712: The output of step 710 is a group of bits represent the binary value of the message M.

| Algorithm 2: Decoding mapped points to message algorithm |
|---|
| Input: Mapped points ($B_i^m$) and IV |
| Output: Binary blocks of message |
| 1    for i = 0; i < no of blocks; i + +; |
| 2      let $B'_i = B_i \oplus$ IV; |
| 3      let $B_i^m$ = map($B'_i$); |
| 4      let IV = $B_i^m$; |
| 5    Encoded message ← the set of $B'_i$; |

Figure 8:
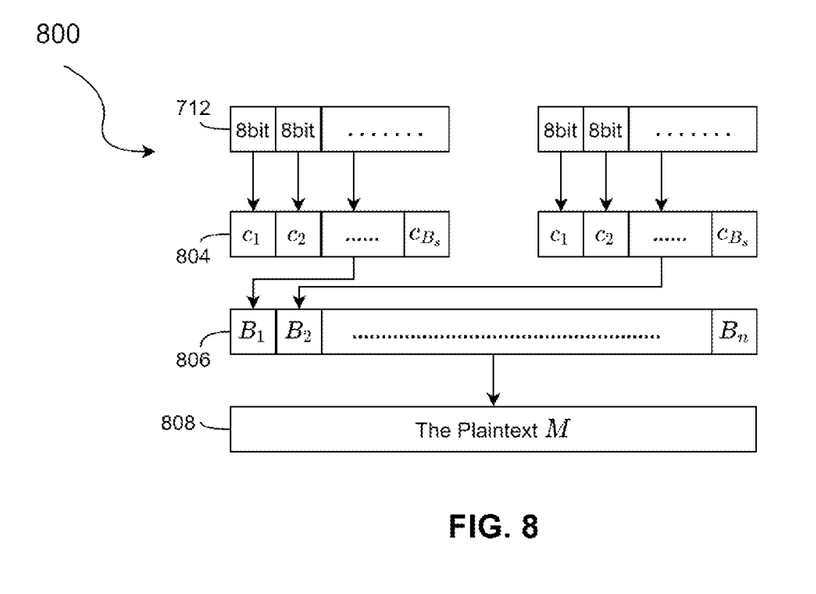
FIG. 8 is a diagram describes the step 114 in FIG. 1, the steps needed to convert the binary value from FIG. 7 to the original message.

FIG. 8 is a diagram 800 describes the step 114 in FIG. 1, the steps needed to convert the binary value from FIG. 7 to the original message. Step 712: Retrieve the group of bits from previous step. Step 804: Convert each 8 bits to its corresponding ASCII code. Step 806: Aggregate each n characters to one block. Step 808: The output of step 806 is the original message M.

It will be apparent to one with skill in the art that the securing method of the encoding and the mapping on ECC of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. A method for securing encoding and mapping in Elliptic Curve Cryptography (ECC) that is secured against several encryption attacks including chosen plaintext attack (CPA) and ciphertext only attack (COA), the method comprising:
   obtaining a plaintext message;
   dividing the plaintext message into a set of s characters, wherein a block size and a number of blocks is obtained from s;
   dividing the message to a set of blocks;
   encoding and manipulating each block with an initial vector (IV) to secure each block to obtain encoded and manipulated blocks;
   mapping the encoded and manipulated block to an elliptic curve (E) to obtain a first mapped point;
   XORing the next block with the first mapped point to obtain a next encoded and manipulated block then map it to the elliptic curve (E);
   repeating the XORing procedure between the next mapped points and the next encoded and manipulated blocks until all blocks have been secured and manipulated;
   encrypting the mapped points using a secret key to obtain encrypted points; decrypting the encrypted points using the secret key to obtain the mapped points;
   decoding the first mapped point by performing an XOR operation between the first block and the initial vector (IV);
   repeating the XORing procedure between the secured and manipulated block and each corresponding mapped point to produce the original nonmanipulated mapped points;
   converting the mapped points to binary values; and converting the binary values and grouping 8 bits of these values to convert to its corresponding character, wherein the plaintext message is all characters grouped in one set.

2. The method of claim 1, wherein dividing the message to the set of blocks comprises steps including:
   obtaining a size of prime number p in bit using an equation used for obtaining a block size (Bs), wherein the equation is BS=[(p−8)/8];
   obtaining the block size based on the size of the prime number p;
   obtaining a the number of blocks based on the block size and the value of s; and
   grouping each set of characters presented in binary values to the set of blocks.

3. The method of claim 2, wherein the initial vector (IV) is obtained with the same size of the prime number p.

4. The method of claim 1, wherein mapping the encoded and manipulated blocks to the elliptic curve (E) includes converting the binary values to decimal values and mapping it to the elliptic curve (E) to obtain the mapped point.

5. The method of claim 1, wherein the mapped points are encrypted by performing an addition operation between the mapped points and the secret key.

6. The method of claim 1, wherein the encrypted points are decrypted by performing a subtraction operation between the encrypted points and the secret key.

7. A system to secure encoding and mapping in Elliptic Curve Cryptography (ECC) that is secured against several encryption attacks including chosen plaintext attack (CPA) and ciphertext only attack (COA), the system comprising:
   circuitry configured to:
   obtaining a plaintext message;
   dividing the plaintext message into a set of s characters, wherein a block size and a number of blocks is obtained from s;
   dividing the message to a set of blocks;
   encoding and manipulating each block with an initial vector (IV) to secure each block to obtain encoded and manipulated blocks; mapping the encoded and manipulated blocks to an elliptic curve (E) to obtain a first mapped points;
   XORing the next block with the first mapped point to obtain a next encoded and manipulated block then map it to the elliptic curve (E);
   repeating the XORing procedure between the next mapped points and the next encoded and manipulated blocks until all blocks have been secured and manipulated;
   encrypting the mapped points using a secret key to obtain encrypted points;
   decrypting the encrypted points by using the secret key to obtain the mapped points;
   decoding the first mapped point by performing an XOR operation between the first block and the initial vector (IV);
   repeating the XORing procedure between the secured and manipulated block and each corresponding mapped point to produce the original nonmanipulated mapped points;
   converting the mapped points to binary values; and
   converting the binary values and grouping 8 bits of these values to convert to its corresponding character, wherein the plaintext message is all characters grouped in one set.

8. The system of claim 7, wherein the circuitry is further configured to:
   obtain a size of prime number p in bit using an equation used for obtaining a block size (Bs), wherein the equation is BS=[(p−8)/8];
   obtain the block size based on the size of the prime number p; obtain number of blocks based on the block size and the value of s; and
   group each set of characters presented in binary values to the set of blocks.

9. The system of claim 8, wherein the initial vector (IV) is obtained with the same size of the prime number p.

10. The system of claim 7, wherein the circuitry is further configured to convert the binary values to decimal values and map it to the elliptic curve (E) to obtain the mapped points.

11. The system of claim 7, wherein the circuitry is further configured to encrypt the mapped points by performing an addition operation between the mapped points and the secret key.

12. The system of claim 7, wherein the circuitry is further configured to decrypt the encrypted points by performing a subtraction operation between the encrypted points and the secret key.

* * * * *